United States Patent [19]

Corwin

[11] Patent Number: 4,477,240

[45] Date of Patent: Oct. 16, 1984

[54] ROTOR BEARING LUBRICATING SYSTEM

[75] Inventor: H. Russell Corwin, Montville, N.J.

[73] Assignee: Deere & Company, Moline, Ill.

[21] Appl. No.: 441,079

[22] Filed: Nov. 12, 1982

[51] Int. Cl.$^3$ .......................... F01C 1/22; F01C 21/04; F16C 3/14

[52] U.S. Cl. ..................... 418/94; 384/288; 384/392

[58] Field of Search ............... 418/61 A, 94; 184/6.5, 184/6.16; 384/398, 288, 389, 391, 392; 74/570; 123/242

[56] References Cited

U.S. PATENT DOCUMENTS 2,386,896  10/1945  Hill et al. ............................ 418/94

3,176,915  4/1965  Bentele et al. ..................... 418/61 A

FOREIGN PATENT DOCUMENTS 2062219  6/1972  Fed. Rep. of Germany ........ 418/94

Primary Examiner—John J. Vrablik

[57] ABSTRACT

The improved rotor bearing lubricating system for the rotor bearing of a Wankel type rotary internal combustion engine comprises an arcuate distribution channel in the surface of the eccentric portion of the mainshaft adjacent the inner bearing surface of at least 180° in length and extending on both sides of an imaginary radial line passing through the point of the maximum throw of the eccentric portion.

3 Claims, 5 Drawing Figures

ROTOR BEARING LUBRICATING SYSTEM

The United States Government has rights in this invention pursuant to Contract No. N00024-80-C-5603.

This invention relates to rotary internal combustion engines of the Wankel type and, more specifically, to lubrication of the rotor bearing supported on the eccentric portion of the driveshaft of the Wankel type rotary internal combustion engine.

BACKGROUND OF THE INVENTION

In rotary internal combustion engines of the Wankel type, an exemplified in the Bentele et al U.S. Pat. No. 3,098,605, dated July 23, 1963, it is conventional to support a rotor for planetary rotary movement in a housing cavity on the eccentric portion of a mainshaft, a sleeve type bearing being carried by the rotor and dimensioned to be in close running fit with the peripheral surface of the eccentric portion of the mainshaft. To provide liquid lubricant to the interstices between the adjacent surfaces of the eccentric portion and the bearing, at least one annular channel is provided on the bearing surface adjacent the peripheral surface of the eccentric portion to receive liquid lubricant from at least one radially extending passageway in the eccentric, which passageway communicates the channel with a main supply passageway in the mainshaft, the main supply passageway receiving liquid lubricant under pressure from a suitable source thereof, as for example an oil pump.

In internal rotary combustion engines of the aforesaid type which are of large size, as for example 350 cubic inch displacement, it has been found that the aforesaid conventional method or system for lubricating the rotor bearing, was unsatisfactory since such bearings overheated and structurally failed. More specifically, it was found that the vector sums of the combustion gas pressures and the centripetal forces of the rotor acting on the eccentric portion of the mainshaft exceeded the load carrying capacity of the bearing by reducing the lubrication film thickness in the interstices between the bearing and eccentric portion of the mainshaft to the point that those surfaces came in direct contact and thus caused overheating and failure of the bearing. Since space limitations prevented the widening of the bearing to increase its load carrying capacity, such an approach was not a solution to the problem. In another unsatisfactory solution, flats were provided in the eccentric surface at the discharge end portions of the radially extending lubrication supply passageways to facilitate distribution of the lubricant over the bearing surface. This proved unsatisfactory because it actually reduced lubricant flow and caused higher temperature rises hence exacerbating the problem. A further unsatisfactory suggestion for solving the problem was to increase the clearance between the bearing and eccentric portion of the mainshaft. This, however, was undesirable because it had the effect of reducing the minimum backlash in the rotor timing gears and could cause contact of the apex portion of the rotor with the rotor housing. A partial solution to the problem is disclosed in West Germany Offenlegungsschrift patent No. 2062219 which issued June 22, 1972. In this patent, an arcuate channel of 90° in length is provided in the surface of the eccentric portion of the mainshaft in the zone of least centripetal force on the eccentric portion of the mainshaft, the arcuate channel starting 30° after an imaginary radial line extending through the point of maximum throw of the eccentric. Two radially extending lubricant supply passages are provided to conduct lubricant from a main supply passageway in the mainshaft to spaced points in the channel. This solution of delivering the lubricant to the area of greatest spacing between the bearing and eccentric portion agreed with applicant's finding that centripetal forces were of greater significance in connection with lubrication of the rotor bearing than the combustion gas pressure forces on the eccentric portion of the mainshaft at high engine rpm, e.g. 3600 rpm. However, the rotor bearing lubricating system disclosed in the aforesaid Offenlegunsschrift patent, is only a partial solution to the rotor bearing lubrication problem because, while it achieves satisfactory distribution of lubricant at high rpm where combustion gas pressures, e.g. 650 psi, are substantially offset by the centripetal forces, it fails to provide the desired distribution of lubricant when the engine is operating at low rpm, e.g. 900 rpm, and under a "lugging" condition or mode. The word "lugging" is to be understood to mean an operating condition or mode where the engine is under high power (throttle wide open) but the engine rpm is low. Under a lugging condition graphically shown in FIG. 5 hereof, the centripetal forces on the eccentric portion are relatively weak and the combustion gas pressures are relatively high and become of significance so that the resultant or mean force on the eccentric portion of the mainshaft is in the general direction of the line of the greatest throw of the eccentric portion instead of on a line generally normal thereto. Under the lugging operative condition, the channel of the rotor bearing lubricating system disclosed in the West German Offenlegungsschrift patent does not provide the desired film of oil between the bearing and eccentric portion of the mainshaft.

Accordingly, it is an object of this invention to provide, in a Wankel type rotary internal combustion engine, a rotor bearing lubrication system which is effective during all operating conditions of the engine to provide the desired distribution of lubricant to the interstices between the eccentric portion of the mainshaft and the surrounding bearing.

It is another object of the present invention to provide, in a Wankel type rotary internal combustion engine, a rotor bearing lubricating system wherein lubricant is effectively distributed to the interstices between the bearing and rotor journal when the engine is in a lugging mode of operation.

SUMMARY OF THE INVENTION

In view of the foregoing, an improved rotor bearing lubricating system or means is provided for a rotary internal combustion engine of the Wankel type.

The rotary internal combustion engine comprises a housing defining a multi-lobe cavity therein and a rotor of multi-sided profile supported on an eccentric portion of a mainshaft for planetary rotary movement in the cavity and defining with the housing cavity a plurality of working chambers which successively expand and contract in volumetric size as the rotor planetates. The eccentric portion or journal of the mainshaft is surrounded by a bearing carried by the rotor.

The improved bearing lubricating system or means comprises a main supply passageway disposed in the mainshaft and communicating with a source of liquid lubricant under pressure and an arcuate channel in the peripheral surface of the eccentric portion which channel extends at least 180° in length adjacent the inner surface of the bearing and on both sides of an imaginary radial line passing through the point of maximum throw of the eccentric portion. The system also includes at least a pair of secondary supply passageways which extend radially in the eccentric portion of the mainshaft to communicate the main supply passageway with the arcuate channel at spaced apart points to supply liquid lubricant to the latter and for flow from the arcuate channel into the interstices between the eccentric portion of the mainshaft and the bearing.

BRIEF DESCRIPTION OF THE DRAWINGS

The invention will be more fully understood from the following description when considered in connection with the accompanying drawings in which.

DESCRIPTION OF THE PREFERRED EMBODIMENT OF THE INVENTION

Figure 1:
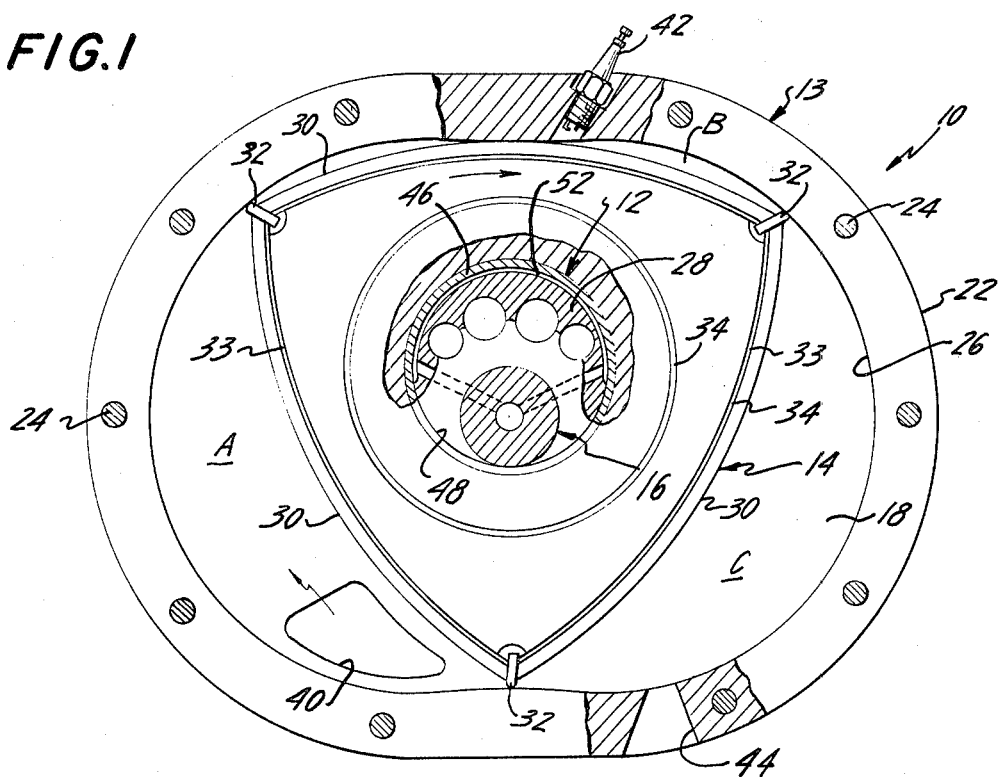
FIG. 1 is a somewhat schematic drawing of a Wankel type rotary internal combustion engine showing the rotor and its supporting driveshaft and having the rotor bearing lubricating means or system according to this invention.

Now, referring to the drawings and more particularly to FIG. 1, the reference number 10 generally designates a Wankel type rotary internal combustion engine having an improved rotor bearing lubricating means or system 12 according to this invention.

As shown in FIG. 1, rotary engine 10 is an internal combustion engine such as fully disclosed in the U.S. Pat. No. 2,988,065 to Wankel et al. The engine 10 comprises a housing 13, a rotor 14 and a mainshaft 16.

The housing 13 consists of two end wall sections 18 (only one being shown) separated by a peripheral wall section 22, the wall sections being secured together in a suitable manner such as by tie bolts 24. The peripheral wall section 22 is provided with an inner surface 26 of trochoidal configuration, which surface together with end wall sections 18 define therebetween a two lobe housing cavity.

The rotor 14 is of generally triangular shaped profile and is supported for planetary rotation within the housing cavity on a journal or eccentric portion 28 of mainshaft 16. The rotor 14 has three contiguous, somewhat curved, flank portions 30 and carries apex seals 32 which engage the trochoidal surface 26 of the housing. The rotor also carries side gas seal strips 33 and oil seal rings 34 on its opposite sides to engage the adjacent inner surfaces of end wall sections 18. The flank portions 30 define with the housing cavity three working chambers A, B and C which successively undergo expansion and contraction in volumetric size as rotor 14 planetates within the housing cavity.

The rotary mechanism 10 operates on the conventional four successive cycles of intake, compression, expansion and exhaust and, to this end, an inlet or intake port 40 is provided in side wall section 20, and an ignition means, such as a spark plug 42, is provided in peripheral wall section 22, and an exhaust port 44. The inlet port 40 is in communication with a source of gaseous fluid, such as a mixture of air and fuel from a carburetor (not shown), via a supply conduit (not shown) connected to end wall section 18. The spark plug 42 is positioned to ignite the combustible, gaseous fluid which has passed into working chambers A, B and C through inlet port 40 and compressed by rotor 14. The products of combustion are discharged on the exhaust cycle from working chambers A, B and C through the exhaust port 44 in peripheral wall section 22. As is conventional in rotary internal combustion engines of the Wankel type having a side intake port, flow of gaseous fluid into working chambers A, B and C through inlet port 40 is timed by the rotation of rotor 14. This is accomplished by constructing and arranging inlet port 40 relative to rotor 14 so that the rotor begins to open inlet port 40, when the rotor carries gas seal strips 33 inwardly of the lower peripheral edge of inlet port 40. The control of fluid flow through a side inlet port by the "scissor" action of the rotor is fully disclosed in the U.S. Pat. No. 3,103,208 to Price et al.

Figure 2:
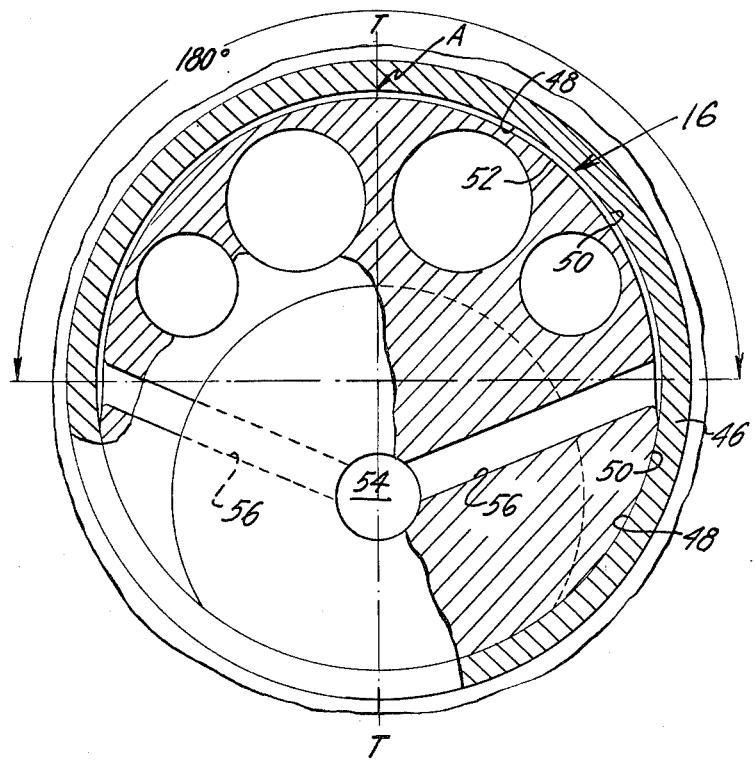
FIG. 2 is an enlarged view of the driveshaft and eccentric portion thereof and rotor bearing lubricating means shown in FIG. 1
Figure 3:
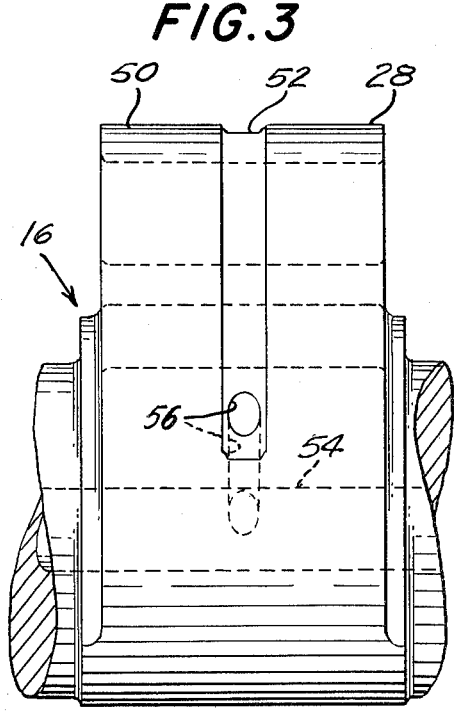
FIG. 3 is a fragmentary side elevational view of the mainshaft and eccentric portion thereof shown on the same scale as FIG. 2.
Figure 4:
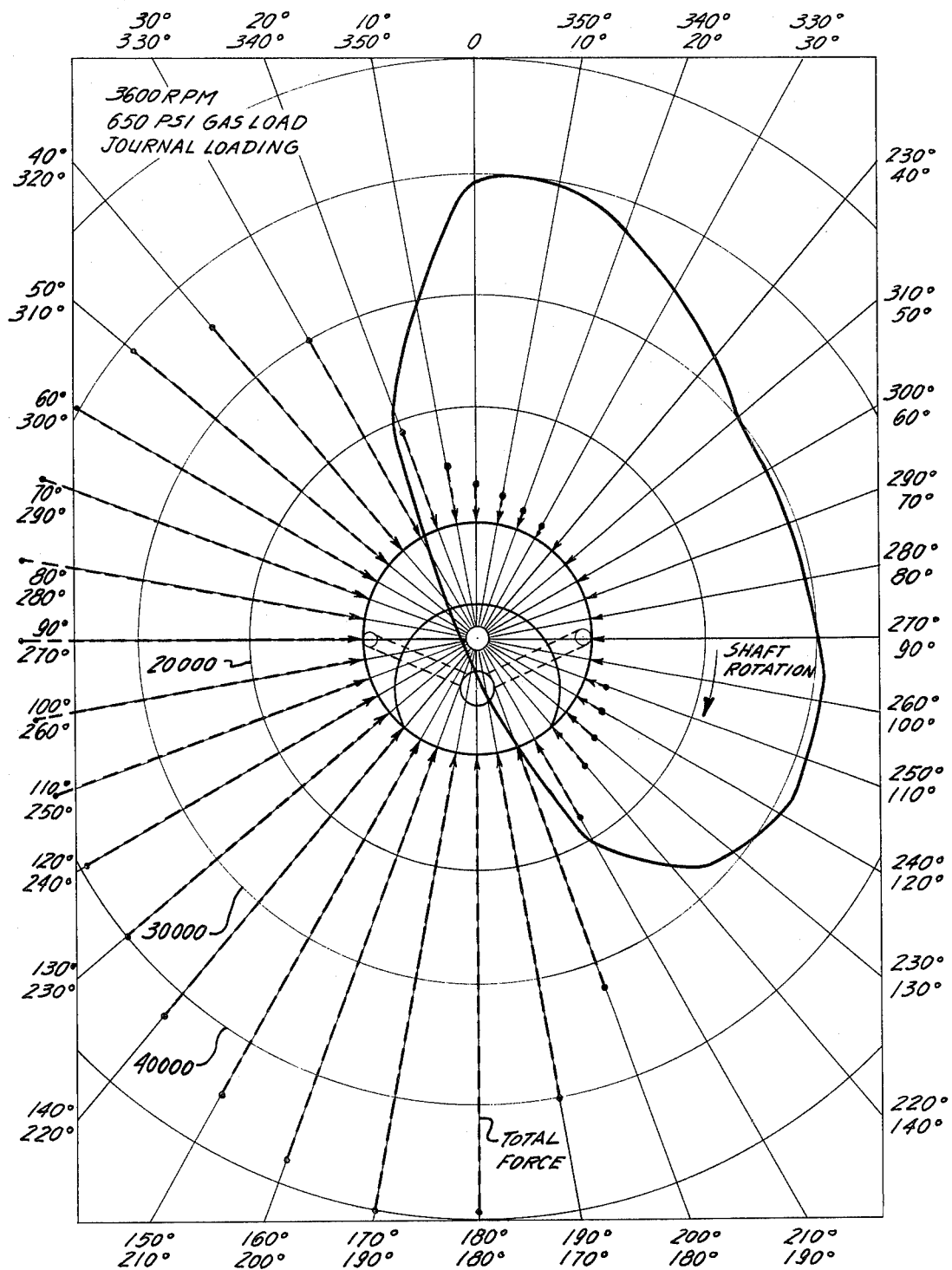
FIG. 4 is a vector and envelope representation of the centripetal forces of the rotor acting on the eccentric portion of the mainshaft resulting from the centripetal forces and combustion gas pressures when a 350 cubic rotary engine is operating at 3,600 rpm and with 650 psi gas loads.
Figure 5:
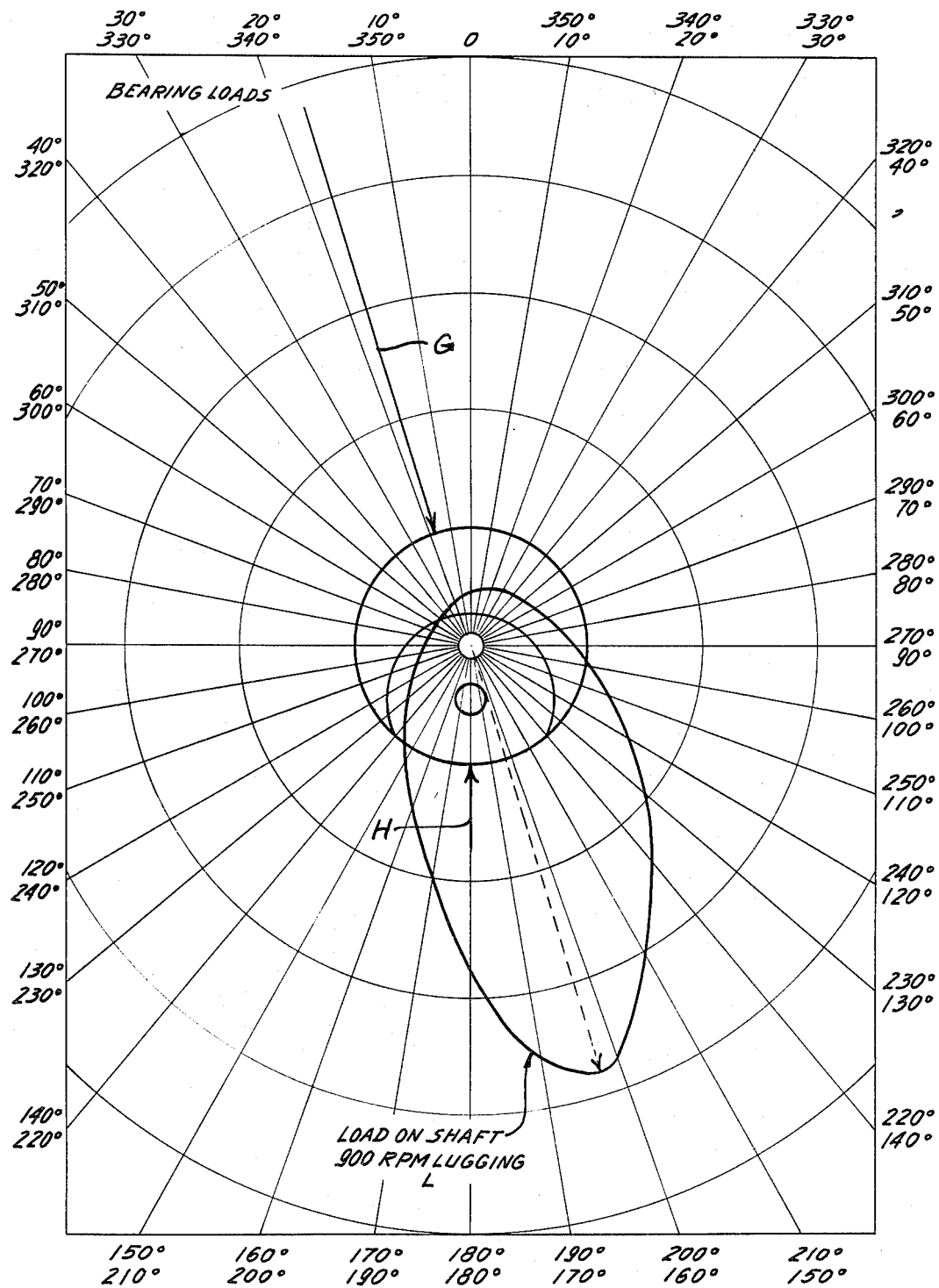
FIG. 5 is a graph showing the envelope of forces exerted on the eccentric portion of the mainshaft only by combustion gas pressure during lugging operation as compared with the envelope of the vector sums of the centrifugal forces exerted by the rotor at 3600 rpm.

As best shown in FIG. 2, the improved rotor bearing lubrication system 12 comprises a sleeve type bearing 46 carried in the hub portion of rotor 14 and dimensioned so that its inner surface 48 is in close running fit with the outer peripheral surface 50 of eccentric portion 28 of mainshaft 16. The inner surface of bearing 46 is unbroken; that is, it is not provided with the conventional annular distribution groove. However, the outer surface of eccentric portion 28 is provided with an arcuated groove or channel 52 for receiving lubricant and distributing the same to the interstices between inner surface 48 of bearing 46 and outer surface 50 of the eccentric portion 28. The channel 52 is at least 180° in length and substantially less than 360° and may be, as shown, a little more than 180° in length. The channel 52 is located so that it lies on both sides of an imaginary radial line T—T which passes through the point A of maximum throw of eccentric portion 50. Liquid lubricant is supplied to channel 52, via a main supply passageway 54 which may be located coaxially in mainshaft 16 and at least two secondary supply passageways 56 radially extending in eccentric portion 28. The mainsupply passageway 54 is in communication with a source (not shown) of lubricant under pressure, as for example an engine driven oil pump, to receive lubricant and pass the same to secondary passageways 56. Each passageway 56 is preferably in communication with an end portion of channel 52 so that lubricant is supplied to opposite ends of the channel to further ensure distribution of lubricant. As can best be seen by comparing FIG. 2 with the graph shown in FIG. 4, wherein loads on eccentric portion 28 of mainshaft 16 is plotted for a 350 cubic inch displacement engine 10 operating at 3600 rpm and with combustion gas pressure of 650 psi, channel 52 overlaps a substantial portion of the area of low total force on the eccentric portion 28. This total force is the resultant of the varying gas pressure force and of the constant magnitude, but varying direction, centripetal force which acts on the eccentric portion 28 of the shaft. The direction of the centripetal force lies along the line connecting the center of the main shaft (which is the axis of rotation) and the center of the eccentric portion 28 (which is the location of the rotor center of gravity). This line rotates at shaft r.p.m. and the centripetal force is constant in magnitude at a given r.p.m. In addition, as best shown graphically in FIG. 5 wherein the envelope L of combustion gas pressures are plotted which act on the eccentric portion 28 of mainshaft 16 when the engine 10 of 350 cubic inch displacement is operating at 900 rpm in a lugging mode at which time the effect of centripetal loads are insubstantial. As shown, the mean direction of the gas pressure forces is represented by the arrow G, which is in a direction essentially opposite the mean centripetal forces represented by the arrow H. Thus, it is desirable to provide a distribution channel 52 in the area of the gas pressure forces represented by the arrow G, that is, as viewed in the drawings, to the left of the radial line T—T. This desirability for a distribution channel in this area of the application of combustion gas pressure on the eccentric portion 28 is provided in applicant's rotor bearing lubricating system 12 by the length and location of channel 52.

In operation of engine 10, the bearing 46 is assured of having a film of lubricant between the inner surface 48 of bearing 46 and outer peripheral surface 50 of eccentric portion 28, under a broad range of operating conditions, including low rotor rpm and in a lugging mode of operation.

It is believed apparent from the foregoing description that the present invention provides an improved rotor bearing lubricating system wherein lubrication distribution to the interstices between the bearing and the rotor journal or eccentric portion of the mainshaft is assured under a broad range of engine operating conditions and that, therefore, such bearing has a relatively long operative life.

Although but one embodiment of the invention has been illustrated and described in detail, it is to be expressly understood that the invention is not limited thereto. Various changes can be made in the arrangement of parts without departure from the scope and spirit of this invention as the same will now be understood by those skilled in the art.

What is claimed is:

1. In a rotary internal combustion engine having a housing defining a multi-lobe cavity therein and a rotor of multi-sided profile supported on an eccentric portion of a rotatably driven mainshaft for planetary rotary movement in said cavity and defining with the housing cavity a plurality of working chambers which successively expand and contract in volumetric size as the rotor planetates, the eccentric portion being surrounded by a bearing carried by the rotor, a rotor bearing lubricating means for said bearing comprising:

A. a main supply passageway in said mainshaft communicating with a source of liquid lubricant under pressure;

B. an arcuate channel of at least 180°, but substantially less than 360°, in length located in the peripheral surface of said eccentric portion adjacent the inner surface of said bearing and extending substantially equally on both sides of the imaginary radial line passing through the point of the maximum throw of said eccentric; and C. at least a pair of secondary supply passageways extending radially in said eccentric portion for communicating the main supply passage with the arcuate channel to supply liquid lubricant to the latter and for flow from the arcuate channel into the interstices between the eccentric portion of the mainshaft and said bearing.

2. The apparatus of claim 1 wherein each secondary supply passage communicates with an opposite end portion of said channel.

3. The apparatus of claim 1 wherein the bearing has an uninterrupted bearing surface.

* * * * *